United States Patent [19]

Ohashi et al.

[11] Patent Number: 4,597,670
[45] Date of Patent: Jul. 1, 1986

[54] METHOD OF MEASURING COLOR DIFFERENCE OF DYESTUFFS

[75] Inventors: Hiromu Ohashi, Sakai; Masakazu Suzuka, Ibaraki; Yukio Murata, Takatsuki; Nobuyoshi Fujitsuka, Ibaraki, all of Japan

[73] Assignee: Sumitomo Chemical Company, Limited, Osaka, Japan

[21] Appl. No.: 583,851

[22] Filed: Feb. 27, 1984

[30] Foreign Application Priority Data

Dec. 1, 1983 [JP] Japan ................... 58-227189

[51] Int. Cl.$^4$ ........................... G01N 21/25
[52] U.S. Cl. ........................ 356/405; 8/400; 264/526
[58] Field of Search ............ 356/402, 405, 406, 407, 356/425; 250/226; 364/498, 526; 8/400

[56] References Cited

U.S. PATENT DOCUMENTS 3,159,742 12/1964 Davidson ................... 356/405
3,690,771 9/1972 Armstrong, Jr. et al. ......... 250/226

FOREIGN PATENT DOCUMENTS 1109642 4/1985 United Kingdom ........... 356/402

OTHER PUBLICATIONS

Lewis, *American Dyestuff Reporter*, 7/20/64, p. 30.
Bunkall, *J. Society Dyers and Colourists*, 5/65, p. 201.
Alderson et al., *J. Society Dyers and Colourists*, V. 77, N. 12, 12/61, p. 657.

*Primary Examiner*—F. L. Evans
*Assistant Examiner*—Joel L. Harringa
*Attorney, Agent, or Firm*—Stevens, Davis, Miller & Mosher

[57] ABSTRACT

A method for measuring the color difference between a sample dye and a standard dye by testing the color properties of both dyes, which comprises measuring the distribution curve of absorbance of individual components of the dye; determining the relationship between the color difference of dye solution and the color difference of dyeings with respect to the standard dye and representative samples arbitrarily selected plural lots of dyes; and predicting the color difference of dyeings from the color difference of solution between the standard dye and the sample dye.

3 Claims, 9 Drawing Figures

METHOD OF MEASURING COLOR DIFFERENCE OF DYESTUFFS

This invention relates to a method for measuring the color difference of dyestuffs. More particularly, it relates to a method for measuring the color difference, which is useful for the quality control of dyestuffs in the dye manufacturing industry.

The conventional quality control of dyes in dye manufacturing works is performed by dyeing an appropriate material with freshly manufactured dye and, in parallel, with a reference dye selected as standard, and measuring the quality difference between the dyed materials. When such simultaneous dyeing is carried out by using equal amount of a dye selected as standard (hereinafter referred to as standard dye) and a dye to be measured for the color difference (hereinafter referred to as sample dye), there occurs a difference in the depth of color between each dyed material depending upon the purity, that is, the coloring matter content of each dye. In order to correct the color difference resulting from the difference in the depth of color, the concentration of dye in the bath is adjusted so that the depth of color of the dyeings may be equalized. The color properties of a dye are evaluated based on the color difference between the dyeings obtained by use of the adjusted bath. The color difference is resolvable into the difference in hue such as, for example, inclination to red or inclination to blue, and the difference in so called brightness which is dependent on the purity of color. The evaluation of the color of a dye by human visual judgement is usually done in terms of three values including the difference in hue, the difference in brightness, and, in addition, the difference in dyeing strength which is the percentage ratio of the quantities of dyes or concentrations of dyebaths necessary for the dyeings of equal color depth. In the conventional method of evaluating the color difference of a sample dye in comparison with a standard dye, it is a usual practice to carry out a sequence of procedural steps comprising preparation of yarn or cloth, preparation of dye solution, preparation of dyebath, dyeing, after treatment, washing, and drying simultaneously for both dyes and then compare the dyeings with each other. Since such a method consumes a great deal of time and man-power and, in addition, the precision of the test is not satisfactory, there is a rising requirement for a method which is more economical, rapid, simple, and precise.

The present inventors, therefore, conducted an extensive study by using numeral experimental data to answer the above requirement and, as a result, accomplished the present invention.

This invention provides a method for measuring the color difference between a sample dye and a standard dye by testing the color properties of both dyes, which is characterized in that using a standard dye and two or more, preferably several, representative samples of the same family (in structure) as that of the standard dye, the relationship between the color difference (relative to the standard dye) of dye solution and the color difference (relative to the standard dye) of dyeings is determined according to the following procedures (2), (3) and (4); then the color difference of the solution of a sample dye is determined according to the following procedure (5); and the color difference of dyeings of the sample dye is predicted according to the following procedure (6) from said relationship and the color difference of the solution. Steps of the procedure are carried out as follows:

(1) Each of the components contained in the dyes of the same family is separated and collected separately by chromatography. Each separated component is measured for the distribution curve of absorbance (spectral absorption curve) and from this curve a distribution curve of absorbance per unit of each separated component content is derived. At this stage, any correction can be made by the use of weighting factors pertaining to the dyeability or the like.

(2-1) The color mixing calculation is performed by using the distribution curve of absorbance per unit of the separated component content obtained in (1) and the value determined by quantitative analysis of each separated component with respect to the standard dye and the representative sample dye of the same family as that of the standard dye, thereby to obtain the distribution curve of absorbance of mixture with respect to the standard dye and the representative sample dye of the same family. The correction by means of a weighting factor is made at this stage unless it has been made in (1).

(2-2) By using the optical density ratio between the standard dye and the representative sample dye of the same family as that of the standard dye, the distribution curve of absorbance of the representative sample dye of the same family obtained in (2-1) is set to coincide with that of the standard dye. The distribution curve of absorbance of the standard dye obtained in (2-1) and the said coincident distribution curve of absorbance of the representative sample dye obtained above are transformed into transmittance curves to obtain tristimulus values X,Y,Z for both the standard dye and the representative sample dye. The tristimulus values are then transformed into a uniform color scale colorimetric system.

The chromaticity difference and lightness difference in this colorimetric system are determined. And then the component of hue difference contained in the chromaticity difference is assumed to be the hue difference of the dye solution. The composite vector in the saturation difference contained in the lightness difference and the chromaticity difference is assumed to be the brightness difference of the dye solution. The foregoing operation is repeated on two or more, preferably several, representative samples different from one another in proportions of coloring matter components.

(3) From the dyeings prepared with the standard dye and the representative sample dye of which the color difference of solution has been determined above, the color difference between the standard dye and the representative sample dye is determined in terms of hue difference and saturation or brightness difference.

(4) The relationship between the color difference of dye solution determined in (2) and the color difference of dyeings determined in (3) is determined in terms of hue difference and saturation or brightness difference.

(5) By using the standard dye and the sample dye, the color difference of solution between the sample dye and the standard dye is calculated in terms of hue difference and saturation or brightness difference, as described in (2).

(6) The color difference of dyeings of the sample dye is predicted from the color difference of solution of the sample dye obtained in (5) and the relationship found in (4).

According to the present invention, it becomes possible to predict the color difference of dyeings from the results of quantitative analysis for dye components without needing the complicated dyeing test. The advantages of the present method may be summarized as follows:

(a) The exclusion of a series of procedures for the dyeing test results in speed-up and simplification of operation steps as well as savings in man-power and energy.

(b) The conventional method for the evaluation of color difference by the dyeing test includes a number of factors which tend to decrease the precision of evaluation, such as differences in the type and shape of the material to be dyed, variation in the evaluation results caused by the variation in dyeing procedure and dyeing equipment, visual judgement susceptible to variation among observers, etc., whereas the precision is much improved in the present method by the preclusion of such factors.

(c) Since the color difference of a sample dye is found precisely and speedily, the present method is applicable to the process control in the dye manufactory with accompanying pronounced economic advantages such as reduction of defective products, curtailment of the waiting time, etc.

(d) The present method can be widely utilized in the developmental stage of novel dyestuffs, resulting in speed-up of the research work.

(e) Requirement from the user of a dye for a change in hue can be quickly answered.

In the present method described above, step (1) can be omitted when all of the coloring matter components in a sample dye can be dyeable.

The method of this invention is described below in detail with reference to the accompanying drawings.

Figure 1:
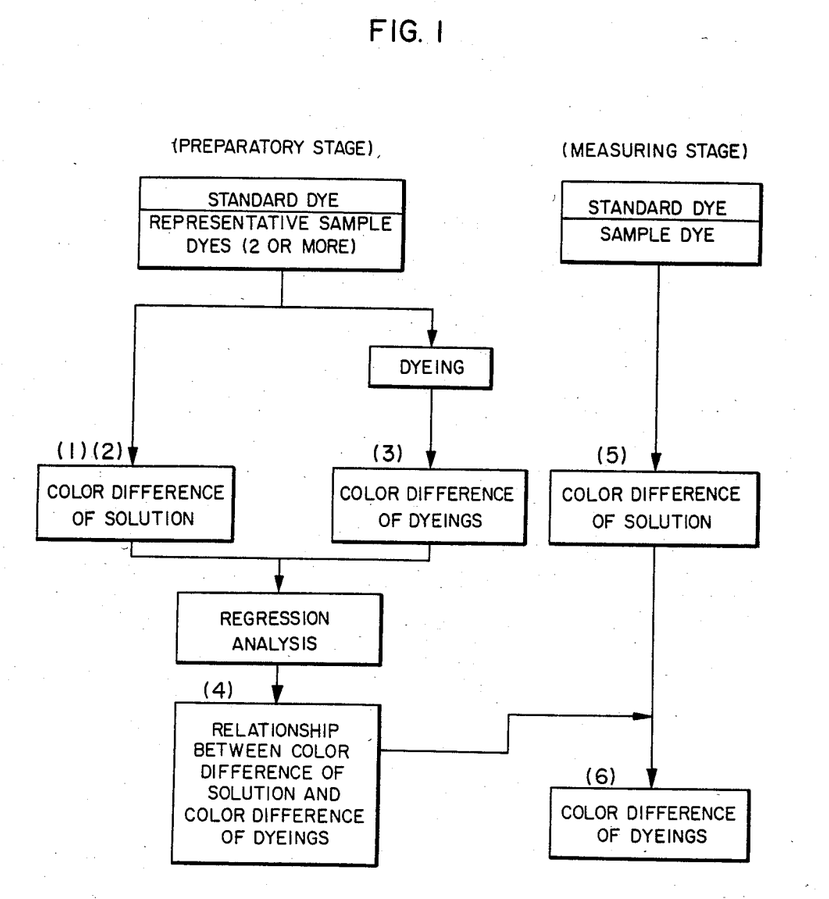
FIG. 1 is a flow chart of the entire procedural steps of the present method.
Figure 2:
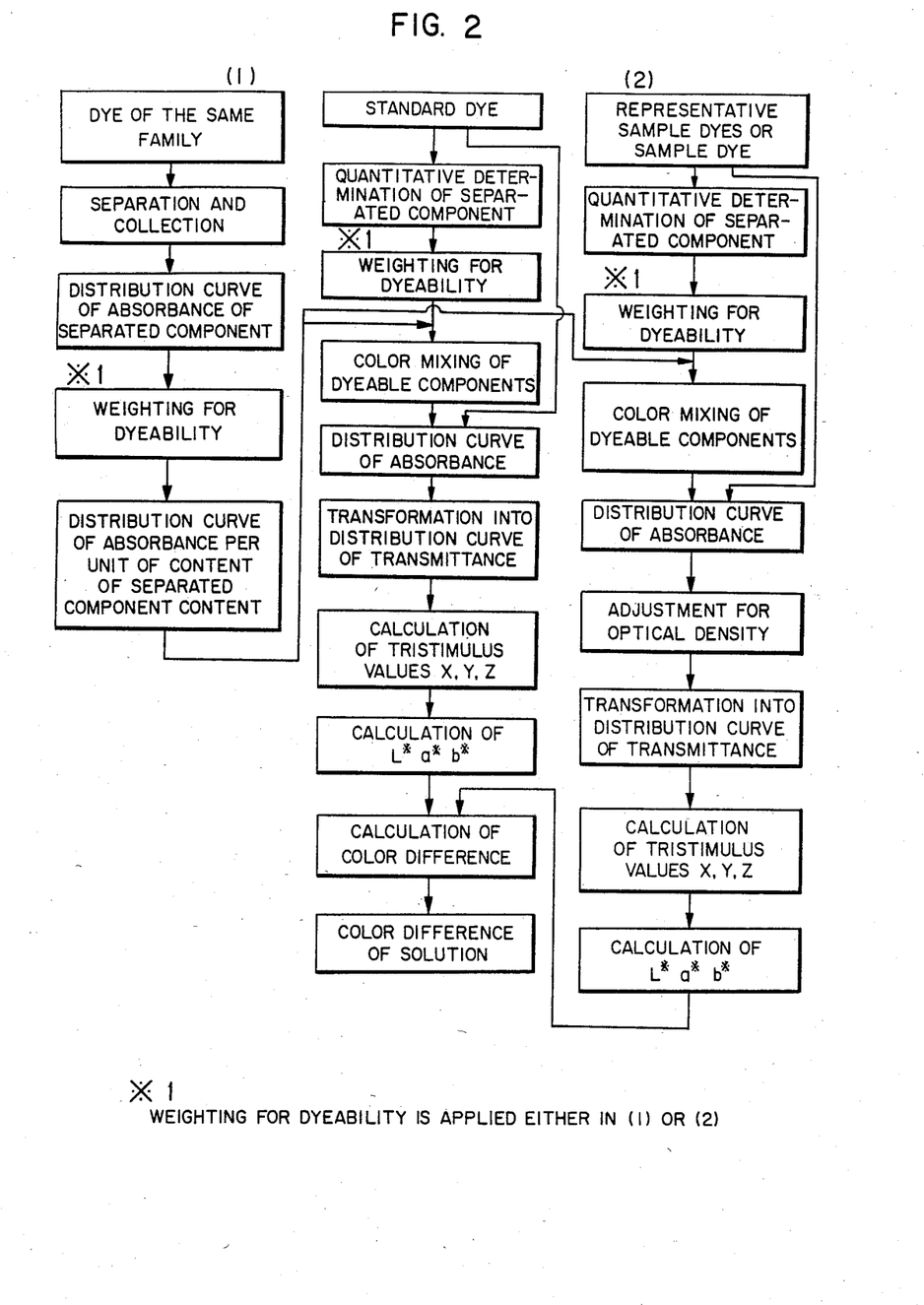
FIG. 2 is a flow chart for the measurement of color difference of dye solution.

In FIGS. 1 and 2 is shown the present method in flow chart. FIG. 1 is the flow chart of the entire procedural steps and FIG. 2 is a flow chart for the measurement of color difference of dye solution. In both FIGS. the encircled figure corresponds to the step number described above.

In FIG. 2, (1) is a step to find color properties (in solution form) of the components constituting a dye. If all of the coloring matter components in a dye can be dyeable, it is possible to omit the above step. (2) is a step to find the distribution curve of absorbance by the color mixing of the components contained in a dye and to find the color difference of dye solution by use of said distribution curve of absorbance. If all of the coloring matter components contained in a dye can be dyable, it is possible to omit the separation and quantitative determination of the components contained in the dye of the same family and the correction with weighting factors relating to dyeability and the like and to use directly the distribution curve of absorbance.

As to chromatographs used in the present method, mention may be made of column chromatograph, paper chromatograph, and liquid chromatograph. Of these, a high performance liquid chromatograph is especially advantageous. The adjustment of measurements by weighting with respect to dyeability and other factors should be made in step (1) or (2-1).

Figure 6:
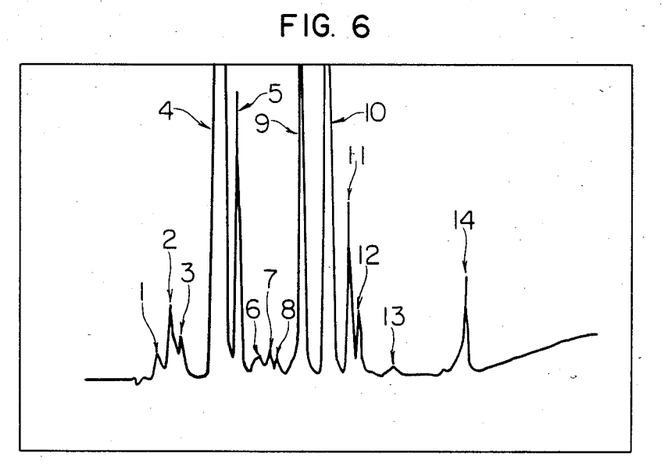
FIG. 6 is a liquid chromatogram of a dye in Example 1.

A typical procedure of the present method in which the liquid chromatograph is used as a means of separation is described below in further detail with reference to the drawings. (1) Each component contained in the dye of the same family is separated and collected by high performance liquid chromatography. The separated component is measured for the distribution curve of absorbance and from this curve a distribution curve of absorbance in the form of color property per unit of each separated component content is derived. An example for a red dye is shown in FIG. 6 which represents a liquid chromatogram obtained in separating each component contained in said dye. The absorbance in the visible spectrum range per unit of each component content of the dye is as shown in Table 2 (given later).

(2) Next, the calculation for color mixing is performed according to the following equations [1], using the results of quantitative analysis for each separated component, the absorbance per unit of content, and the correction factor for the dyeability (hereinafter referred to as dyeing coefficient) of each separated component with respect to the standard dye and the representative sample dye, thereby to obtain the absorbance of mixture for both dyes. The calculation can be carried out by means of a computer.

$$\left. \begin{array}{l} D_{st,\ \lambda} = \sum_{n=1}^{n=n} Dn\lambda pn,\ st\ Sn \\ D_{sp,\ \lambda} = \sum_{n=1}^{n=n} Dn\lambda pn,\ sp\ Sn \end{array} \right\} \quad [1]$$

wherein st and sp refer to standard dye and representative sample dye, respectively, n is the number of separated individual components, pn is a value obtained by dividing the individual component content by the main component content and multiplying by 100 (hereinafter referred to as ratio of individual component to main component), each component being obtained by the method of peak area normalization, $Dn\lambda$ is a value obtained by dividing the absorbance of separated individual component by pn, $\lambda$ being 200–800 nm, and Sn is the dyeing coefficient of individual component.

Figure 3:
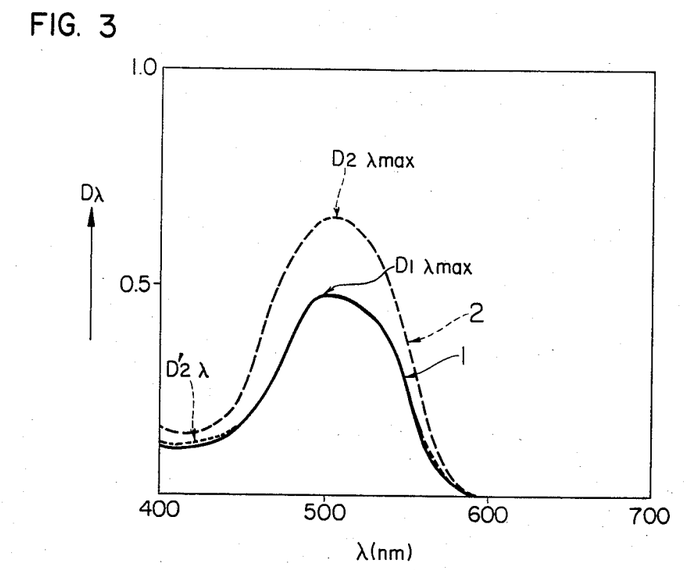
FIG. 3 is a distribution curve of absorbance of a dye.

The distribution curve of absorbance is then converted through the following equation [2] so that the optical density of the representative sample dye solution may become equal to that of the standard dye solution, thereby to preclude that portion of the color difference originated from the difference in depth of color (FIG. 3).

$$D_2'\lambda = D_2\lambda \frac{D_1\lambda max}{D_2\lambda max} \quad [2]$$

Wherein $D_1\lambda max$ is the maximum absorbance of standard dye 1, $D_2\lambda max$ is the maximum absorbance of representative sample dye 2, and $D_2'\lambda$ is the absorbance of representative sample dye adjusted to the identical optical density as that of the standard dye, λmax being the wavelength of maximum absorbance.

There is another method of adjustment from the viewpoint of visually perceptible depth of color. In this method the adjustment is made on the basis of adjusted complementary tristimulus values which are obtained by adjusting the spectral absorbances in the visible spectral range by means of a weight factor so as to meet the human color perception and integrating the spectral absorbances over the whole visible spectrum range. An example of the method is described below.

The complementary tristimulus values (X',Y',Z') to three primary colors perception are calculated by means of the following formulas [3]:

$$X' = \int P\lambda \bar{x}\lambda D\lambda d\lambda$$
$$Y' = \int P\lambda \bar{y}\lambda D\lambda d\lambda \quad [3]$$
$$Z' = \int P\lambda \bar{z}\lambda D\lambda d\lambda$$

$$SQ = X' + Y' + Z' \quad [4]$$

SQ, which is called total complementary tristimulus values, is calculated with respect to both the standard dye and the sample dye. For simplification, it is possible to substitute the maximum value among X', Y' and Z' for SQ. This method sometimes gives favorable results in the case of a dye having a nearly pure color. The absorbance of a representative sample dye, $D_2'\lambda$, which is adjusted to the identical optical density is calculated according to the following equation [5]:

$$D_2'\lambda = D_2\lambda \frac{SQ_1}{SQ_2} \quad [5]$$

wherein $SQ_1$ corresponds to SQ of the standard dye at predetermined optical density calculated by means of equation [4], and $SQ_2$ corresponds to SQ determined from the distribution curve of absorbance of the representative sample dye adjusted to the identical optical density.

Figure 4:
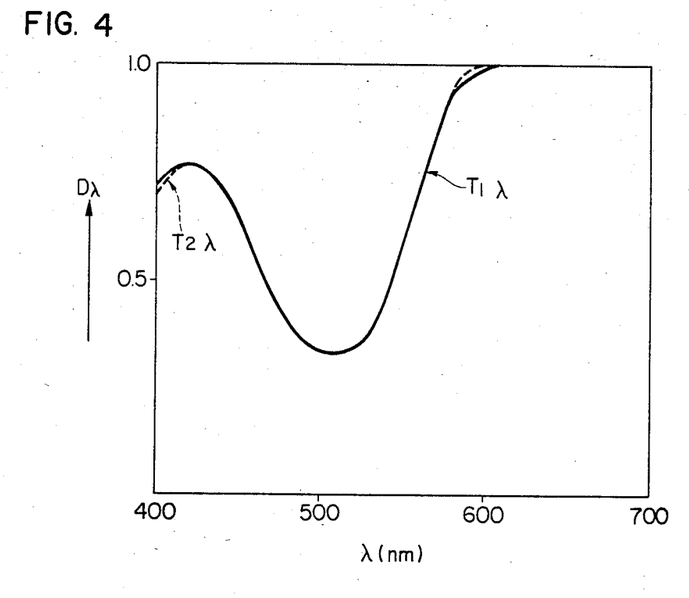
FIG. 4 is a spectral transmittance curve of a dye.

The absorbance of the standard dye and that of the representative sample dye adjusted to the identical optical density are then converted into transmittance through the following equations [6] as shown in FIG. 4.

$$T_1\lambda = 1/\text{Exp} (D_1\lambda/0.4343)$$
$$T_2\lambda = 1/\text{Exp} (D_2'\lambda/0.4343) \quad [6]$$

wherein $T_1\lambda$ is the transmittance of the standard dye, $T_2\lambda$ is that of the representative sample dye adjusted to identical optical density, $D_1\lambda$ is the absorbance of the standard dye, and $D_2'\lambda$ is the absorbance of the representative sample dye adjusted to identical optical density.

The tristimulus values of the standard dye and the representative sample dye are calculated by means of the following equations [7]:

$$X = K\int P\lambda \bar{x}\lambda T\lambda d\lambda$$
$$Y = K\int P\lambda \bar{y}\lambda T\lambda d\lambda \quad [7]$$
$$Z = K\int P\lambda \bar{z}\lambda T\lambda d\lambda$$

$$K = 100\int P\lambda \bar{y}\lambda d\lambda \quad [8]$$

wherein $\bar{x}\lambda, \bar{y}\lambda, \bar{z}\lambda$ are spectral tristimulus values such as those described in CIE 1964 Supplementary Colorimetric System (Specification of colors in the visual field subtending 10° according to X,Y,Z colorimetric system) or in CIE 1931 Standard Colorimetric System (Specification of colors in the visual field subtending 2° according to X,Y,Z colorimetric system). Pλ is the spectral distribution of a standard illuminant such as those corresponding to the light sources generally used in color evaluation, the most frequently used one being $D_{65}$. Tλ is the transmittance of the standard dye or representative sample dye, λ being the wavelength. dλ is the spectral wavelength interval for the integral calculation. A generally used interval is 10 or 20 nm, the latter interval being used herein. Since the absorbance at λmax is on the same basis, the calculated value of X,Y,Z correspond to the color specification values when the optical density of the representative sample dye is adjusted to that of standard dye. These values are then transformed into a uniform color scale system such as CIE 1976 (L*a*b*) colorimetric system recommended by CIE in 1976.

$$L^* = 116 (Y/Y_o)^{\frac{1}{3}} - 16$$
$$a^* = 500 [(X/X_o)^{\frac{1}{3}} - (Y/Y_o)^{\frac{1}{3}}] \quad [9]$$
$$b^* = 200 [(Y/Y_o)^{\frac{1}{3}} - (Z/Z_o)^{\frac{1}{3}}]$$

When the standard illuminant is $D_{65}$ (visual field subtending 10°), the following results are obtained:

$X_o = 94.811$ $Y_o = 100.0$ $Z_o = 107.334$

Figure 5:
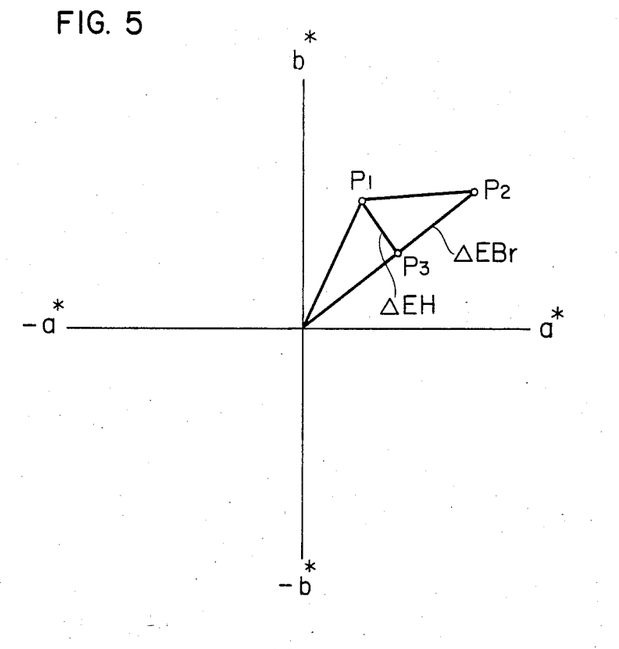
FIG. 5 is a chromaticity diagram according to CIE 1976 L*a*b* colorimetric system.

The color difference of solution between the standard dye and the representative sample dye is derived from the above colorimetric system. The relation between the hue difference and the brightness difference in this colorimetric system is as shown in FIG. 5. In chromatic colors, the component of lightness difference contained in the brightness difference is so small that the latter can be replaced by saturation difference. In FIG. 5, $P_1$ is the chromaticity point of the standard dye, $P_2$ is that of the representative sample dye of adjusted optical density, and $P_3$ is a point at which the line, i.e. constant hue line, connecting between the origin (achromatic color) and the point $P_2$ intersects the line passing through point $P_1$ and perpendicular to the constant hue line. The distance between $P_1$ and $P_3$ corresponds to the component of hue difference contained in the color difference and the distance between $P_2$ and $P_3$ corresponds to the component of brightness difference in the color difference. Since $P_2$ is the chromaticity point of the representative sample dye which has been adjusted to the same integrated optical density as that of the standard dye, there is no color difference due to the difference in color depth. Consequently, the two color differences referred to above represent the hue difference and the brightness difference. L* is the coordinate axis perpendicular to the plane a* b* at the origin (achromatic color). Therefore, the color difference can be calculated approximately by the following equations (10):

$$\left.\begin{array}{l}\Delta E = \sqrt{(\Delta L^*)^2 + (\Delta a^*)^2 + (\Delta b^*)^2} \\ \Delta EBr = \sqrt{(\Delta L^*)^2 + \Delta[(a^*)^2 + (b^*)^2]} \\ \Delta EH = \sqrt{(\Delta E)^2 - (\Delta EBr)^2}\end{array}\right\} \quad [10]$$

wherein ΔE is the color difference between two colors, ΔEH the hue difference, and ΔEBr the brightness difference.

The foregoing procedure is repeated on two or more, preferably several, representative samples having different ratios of coloring matter components, thereby to determine the color difference of solution of each representative sample dye.

(3) Customary dyeing test is performed on the standard dye and the same representative samples as used above. The difference of dyeing color of each representative sample dye from that of the standard dye is measured in terms of hue difference and saturation or brightness difference.

(4) The relation between the color difference of dye solution and the color difference of dyeings is statistically determined in the form of regression line (FIG. 7) for example.

(5) The color difference of dye solution between the standard dye and the sample dye is determined in the same manner as in (2).

(6) It is thus possible to predict the color difference of dyeings in terms of hue difference and brightness difference from the color difference of dye solution of the sample dye obtained in (5) by referring to the relation established in (4).

The invention is illustrated below with reference to Examples, in which all parts are by weight.

EXAMPLE 1

Measurement Of Color Difference Of Representative Sample Solution

Color Index (C.I.) Reactive Red 111 is separated into individual components by means of a high performance liquid chromatograph under the following conditions of separation. The dye solution for injection is prepared by dissolving 0.12 part of the dye in water and making up to 100 parts with water.

Conditions for high performance liquid chromatographic separation:
Column: Lichrosorb RP$_{18}$ (Sumika Analytical Center Co.)
Mobile phase:
  Liquid A: 0.05% DBAP in water.
  Liquid B: 0.05% DBAP in methanol.
Elution: Gradient method.

The concentration of liquid B is increased from the starting concentration of 30% up to 40% after 20 minutes, then to 100% after another 20 minutes.

Flow rate: 1 ml/minute.
Monitoring wavelength: 512 nm
Sample volume: 5 μl

The content of each component is determined by the method of peak area normalization and the ratio of each separated component to the main component is calculated (Table 1).

Figure 9:
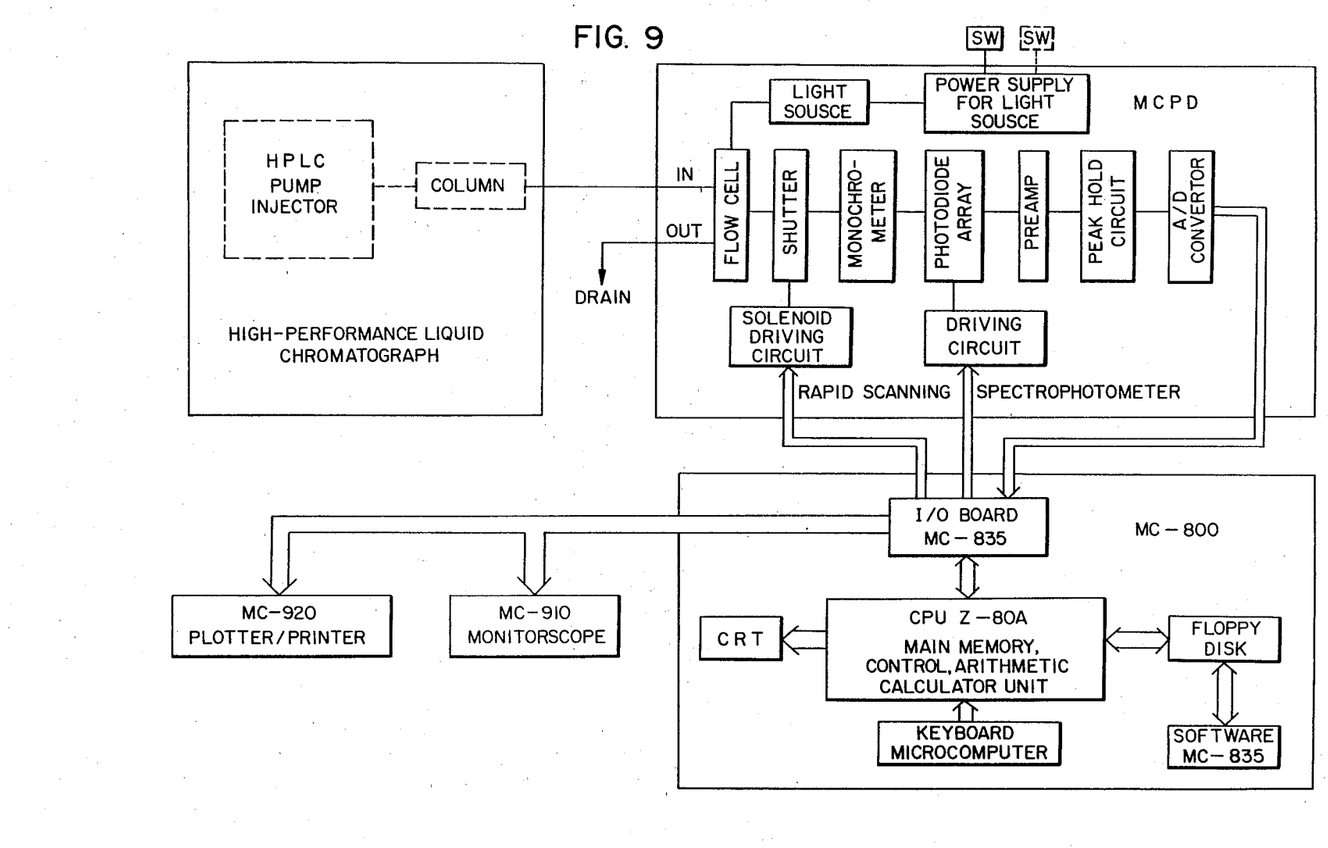
FIG. 9 is a drawing illustrating the construction of the absorbance measuring system using a spectrophotometer of the rapid scanning type.

In the next step, each of the separated components is measured for the distribution curve of absorbance in the visible spectrum range by means of a rapid scanning spectro-photometer shown in FIG. 9. The distribution curve of absorbance per unit of content is constructed by plotting the quotient obtained by dividing the absorbance by the ratio of individual component to main component (hereinafter this quotient is referred to as absorbance coefficient). In Table 2 are shown absorbance coefficients, Dnλ, of each component thus obtained (wavelength interval is 20 nm).

TABLE 1

| Component No. | Ratio of individual component to main component, % |
|---|---|
| 1 | 0.29 |
| 2 | 0.95 |
| 3 | 0.58 |
| 4 | 100.00 |
| 5 | 3.76 |
| 6 | 0.33 |
| 7 | 0.25 |
| 8 | 0.16 |
| 9 | 9.03 |
| 10 | 24.02 |
| 11 | 2.21 |
| 12 | 0.65 |
| 13 | 0.29 |
| 14 | 1.61 |

TABLE 2

| Wavelength nm | Component No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 400 | 0.0021 | 0.0036 | 0.0036 | 0.0016 | 0.0026 | 0.0012 | 0.0044 | 0.0025 | 0.0024 | 0.0024 | 0.0037 | 0.0034 | 0.0007 | 0.0022 |
| 420 | 0.0024 | 0.0049 | 0.0052 | 0.0012 | 0.0020 | 0.0009 | 0.0060 | 0.0013 | 0.0017 | 0.0018 | 0.0028 | 0.0040 | 0.0003 | 0.0016 |
| 440 | 0.0024 | 0.0073 | 0.0076 | 0.0020 | 0.0034 | 0.0012 | 0.0092 | 0.0031 | 0.0030 | 0.0030 | 0.0044 | 0.0060 | 0.0010 | 0.0025 |
| 460 | 0.0034 | 0.0096 | 0.0093 | 0.0036 | 0.0060 | 0.0015 | 0.0120 | 0.0056 | 0.0054 | 0.0053 | 0.0078 | 0.0089 | 0.0017 | 0.0045 |
| 480 | 0.0069 | 0.0118 | 0.0116 | 0.0065 | 0.0102 | 0.0030 | 0.0168 | 0.0100 | 0.0093 | 0.0093 | 0.0132 | 0.0134 | 0.0028 | 0.0078 |
| 500 | 0.0100 | 0.0102 | 0.0098 | 0.0095 | 0.0143 | 0.0061 | 0.0152 | 0.0144 | 0.0130 | 0.0133 | 0.0150 | 0.0162 | 0.0045 | 0.0111 |
| 520 | 0.0117 | 0.0065 | 0.0062 | 0.0095 | 0.0141 | 0.0073 | 0.0104 | 0.0163 | 0.0128 | 0.0131 | 0.0115 | 0.0146 | 0.0034 | 0.0111 |
| 540 | 0.0114 | 0.0035 | 0.0031 | 0.0088 | 0.0128 | 0.0070 | 0.0068 | 0.0150 | 0.0116 | 0.0121 | 0.0107 | 0.0122 | 0.0028 | 0.0102 |
| 560 | 0.0072 | 0.0009 | 0.0009 | 0.0029 | 0.0044 | 0.0033 | 0.0028 | 0.0069 | 0.0037 | 0.0042 | 0.0048 | 0.0045 | 0.0010 | 0.0035 |
| 580 | 0.0028 | 0.0001 | 0.0005 | 0.0003 | 0.0005 | 0.0006 | 0.0012 | 0.0019 | 0.0004 | 0.0005 | 0.0009 | 0.0006 | 0.0000 | 0.0004 |
| 600 | 0.0014 | 0.0001 | 0.0002 | 0.0001 | 0.0001 | 0.0003 | 0.0004 | 0.0006 | 0.0001 | 0.0001 | 0.0002 | 0.0003 | 0.0000 | 0.0001 |
| 620 | 0.0007 | 0.0001 | 0.0000 | 0.0000 | 0.0000 | 0.0003 | 0.0008 | 0.0013 | 0.0000 | 0.0000 | 0.0000 | 0.0002 | 0.0000 | 0.0000 |
| 640 | 0.0000 | 0.0001 | 0.0002 | 0.0000 | 0.0000 | 0.0003 | 0.0008 | 0.0006 | 0.0000 | 0.0000 | 0.0000 | 0.0002 | 0.0000 | 0.0001 |
| 660 | 0.0003 | 0.0001 | 0.0003 | 0.0000 | 0.0000 | 0.0003 | 0.0008 | 0.0006 | 0.0000 | 0.0000 | 0.0000 | 0.0003 | 0.0000 | 0.0001 |
| 680 | 0.0003 | 0.0002 | 0.0005 | 0.0000 | 0.0001 | 0.0003 | 0.0012 | 0.0006 | 0.0000 | 0.0001 | 0.0002 | 0.0006 | 0.0000 | 0.0002 |
| 700 | 0.0003 | 0.0002 | 0.0005 | 0.0001 | 0.0002 | 0.0006 | 0.0012 | 0.0013 | 0.0001 | 0.0001 | 0.0002 | 0.0003 | 0.0007 | 0.0003 |

In the liquid chromatogram shown in FIG. 6, the component No. 9 is an unfixed component and, hence, its dyeing coefficient $S_9$ is assumed to be zero, whereas those of other components to be 1.0.

The separation and quantitative determination of individual components of the standard dye and two or more representative samples are carried out under the same conditions of separation as described above. Using the ratio, $P_n$ (Table 3), of separated individual component to main component thus determined with respect to the standard dye and representative sample dye the mixing calculation is carried out according to the aforementioned formulas [1] to obtain the absorbances of mixtures (Table 4). The absorbance of the representative sample dye adjusted to the same optical density as that of the standard dye is obtained according to the formula [2] (Table 4).

The absorbance of the standard dye and that of the representative sample dye adjusted to the same optical density are then transformed into transmittances through the equation [6] (Table 5).

TABLE 3

| | Standard dye | | Representative sample |
|---|---|---|---|
| Component No. | Ratio to main component, % | Component No. | Ratio to main component, % |
| 1 | 0 | 1 | 0 |
| 2 | 0.19 | 2 | 1.47 |
| 3 | 0 | 3 | 0 |
| 4 | 100.00 | 4 | 100.00 |
| 5 | 2.03 | 5 | 3.78 |
| 6 | 0 | 6 | 0 |
| 7 | 0 | 7 | 0.13 |
| 8 | 0 | 8 | 0 |
| 9 | 5.10 | 9 | 4.78 |
| 10 | 14.38 | 10 | 14.04 |
| 11 | 1.04 | 11 | 0.81 |
| 12 | 0.30 | 12 | 0.48 |
| 13 | 0 | 13 | 0 |
| 14 | 0.52 | 14 | 0.53 |

TABLE 4

| | Sample | | |
|---|---|---|---|
| Wavelength, nm | Absorbance of mixture of standard dye | Absorbance of mixture of representative sample | Adjusted absorbance of mixture of representative sample |
| 400 | 0.2066 | 0.2154 | 0.2093 |
| 420 | 0.1518 | 0.1618 | 0.1572 |
| 440 | 0.2615 | 0.2770 | 0.2691 |
| 460 | 0.4663 | 0.4886 | 0.4747 |
| 480 | 0.8276 | 0.8590 | 0.8346 |
| 500 | 1.2023 | 1.2375 | 1.2023 |
| 520 | 1.1871 | 1.2170 | 1.1824 |
| 540 | 1.0964 | 1.1199 | 1.0881 |
| 560 | 0.3680 | 0.3756 | 0.3649 |
| 580 | 0.0433 | 0.0442 | 0.0429 |
| 600 | 0.0082 | 0.0086 | 0.0084 |
| 620 | 0.0016 | 0.0019 | 0.0018 |
| 640 | 0.0010 | 0.0013 | 0.0013 |
| 660 | 0.0014 | 0.0018 | 0.0017 |
| 680 | 0.0042 | 0.0048 | 0.0047 |
| 700 | 0.0093 | 0.0100 | 0.0097 |

TABLE 5

| | Sample | |
|---|---|---|
| Wavelength, nm | Standard dye | Representative sample |
| 400 | 0.621 | 0.618 |
| 420 | 0.705 | 0.696 |
| 440 | 0.548 | 0.538 |
| 460 | 0.342 | 0.335 |
| 480 | 0.149 | 0.146 |
| 500 | 0.063 | 0.063 |
| 520 | 0.065 | 0.066 |

TABLE 5-continued

| | Sample | |
|---|---|---|
| Wavelength, nm | Standard dye | Representative sample |
| 540 | 0.080 | 0.082 |
| 560 | 0.429 | 0.432 |
| 580 | 0.905 | 0.906 |
| 600 | 0.981 | 0.981 |
| 620 | 0.996 | 0.996 |
| 640 | 0.998 | 0.997 |
| 660 | 0.997 | 0.996 |
| 680 | 0.990 | 0.989 |
| 700 | 0.979 | 0.978 |

From the above values of transmittance and the formulas [7], complementary tristimulus values X, Y, Z of the standard dye and the representative sample dye are calculated. The values obtained are $X = 68.166$ $Y = 45.215$ $Z = 45.460$ for the standard dye and $X = 68.071$ $Y = 45.264$ $Z = 44.724$ for the representative sample dye.

The cordinates are transformed through the equations [9] into a uniform color scale such as, for example, CIE 1976 (L*a*b*) colorimetric system recommended by CIE in 1976. The results obtained are $L^* = 73.064$ $a^* = 64.137$ $b^* = 3.346$ for the standard dye and $L^* = 73.096$ $a^* = 63.790$ $b^* = 4.216$ for the representative sample dye.

The color difference of solution of the representative sample dye with respect to the standard dye is calculated by using the above colorimetric system and the formulas [10] to obtain the following results:

Hue difference = 0.89

Brightness difference = 0.30

The foregoing operation is repeated by selecting several representative samples different from one another in proportions of coloring matter components.

Measurement Of Color Difference Of Dyeings On Representative Sample

Dye solutions are prepared by dissolving in 50 parts of water 0.2 part of the same standard dye or 0.15 part (a quantity which gives a solution of the same depth of color as that of the standard dye and which is variable for each representative sample) of the same representative samples as used above. To each solution are added 0.5 part of "Duck aligne NSPM" (a sodium alginate produced by Kamogawa Kasei Co.), 5 parts of sodium m-nitrobenzene-sulfonate and 2 parts of sodium hydrogencarbonate to prepare a total of 100 parts of padding liquor. A piece of cotton cloth is allowed to absorb uniformly the liquor by dipping. After drying, the cloth is subjected to steaming in a steamer at 100° C. for 5 minutes, then washing, soaping, and drying. The color difference of dyeings of representative samples against the dyeings of the standard dye is measured in terms of hue difference and brightness difference.

Figure 7:
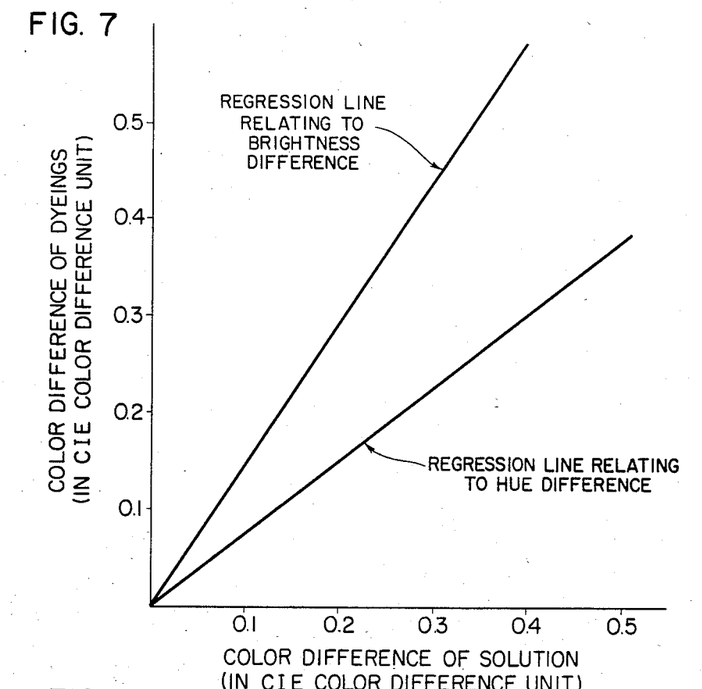
FIG. 7 is a relationship between the color difference in dye solution and the color difference in dyeings.

Determination of Relationship between Color Difference of Dyeings and Color Difference of Dye Solution with Respect to Representative Sample Using the data of color difference of dyeings and the color difference of solution obtained above, regression analysis is performed to determine the rela-tionship in the form of regression line between the color difference of dye solution and the color difference of dyeings with respect to representative sample (FIG. 7).

Measurement of Color Difference of Solution of Sample Dye

In a manner similar to that described previously, the color difference of solution of the sample dye is measured in terms of hue difference and brightness difference against the standard dye.

Prediction of Color Difference of Dyeings with Respect to Sample Dye

Using the color difference of solution of the sample dye obtained above, the predicted color difference of dyeings is obtained from the regression line. In Table 6 are shown both the predicted color difference thus obtained and the color difference obtained by actual dyeing with the sample dye.

TABLE 6

| Sample No. | | CIE 1976 L*a*b* colorimetric system | | |
| --- | --- | --- | --- | --- |
| | | Color difference of solution | Predicted color difference of dyeings | Result of dyeing |
| 1-1 | Hue | 0.89 | 0.68 | 0.68 |
| | Brightness | 0.30 | 0.44 | 0.44 |

The values of predicted color difference of dyeings obtained on other sample dyes (1-2) to (1-6) are shown in Table 7 together with the results of dyeing in side-by-side arrangement.

TABLE 7

| Sample No. | | CIE 1976 L*a*b* colorimetric system | | |
| --- | --- | --- | --- | --- |
| | | Color difference of solution | Predicted color difference of dyeings | Result of dyeing |
| 1-2 | Hue | 0.07 | 0.06 | 0.05 |
| | Brightness | 0.02 | 0.03 | 0.03 |
| 1-3 | Hue | 0.34 | 0.27 | 0.27 |
| | Brightness | 0.11 | 0.16 | 0.15 |
| 1-4 | Hue | 0.03 | 0.03 | 0.04 |
| | Brightness | 0.01 | 0.01 | 0.01 |
| 1-5 | Hue | 0.39 | 0.30 | 0.30 |
| | Brightness | 0.43 | 0.63 | 0.63 |
| 1-6 | Hue | 0.05 | 0.05 | 0.05 |
| | Brightness | 0.02 | 0.03 | 0.04 |

As is seen from the above experimental results, the predicted values of color difference of dyeings obtained by the above method (predicted color difference of dyeings) show satisfactory agreement with the values obtained by actual dyeing (result of dyeing).

EXAMPLE 2

Measurement of Color Difference of Representative Sample Solution

Color Index No. (C.I. No.) Disperse Blue 301 is separated into individual components by means of a high performance liquid chromatograph under the following conditions of separation. The dye solution for injection is prepared by dissolving 0.12 part of the dye in acetonitrile and making up to 100 parts with the same solvent.

Conditions for high performance liquid chromatographic separation:

Column: Lichrosorb $RP_{18}$ (Sumika Analytical Center Co.)
Mobile phase:
  Liquid A: water
  Liquid B: acetonitrile
Elution: Gradient method The concentration of liquid B is increased from the starting concentration of 60 % up to 70 % after 20 minutes, then to 100% after subsequent 15 minutes.
Flow rate: 1 ml/minute.
Monitoring wavelength: 592 nm
Sample volume: 5 μl The content of each component is determined by the method of peak area normalization and the ratio of each separated component to main component is calculated (Table 8).

In the next step, each of the separated components is measured for the distribution curve of absorbance in the visible spectrum range by means of a rapid scanning spectrophotometer shown in FIG. 9. The distribution curve of absorbance per unit of content is constructed by plotting the quotient obtained by dividing the absorbance by the ratio of individual component to main component (hereinafter this quotient is referred to as absorbance coefficient). In Table 9 are shown absorbance coefficients, $D_n\lambda$, of each component thus obtained (wavelength interval is 20 nm).

TABLE 8

| Component No. | Ratio of individual component to main component, % |
| --- | --- |
| 1 | 6.27 |
| 2 | 2.32 |
| 3 | 0.12 |
| 4 | 1.22 |
| 5 | 9.14 |
| 6 | 0.39 |
| 7 | 4.71 |
| 8 | 3.93 |
| 9 | 34.16 |
| 10 | 0.84 |
| 11 | 4.04 |
| 12 | 100.00 |
| 13 | 0.86 |

TABLE 9

| Wavelength nm | Component No. | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| 400 | 0.0011 | 0.0021 | 0.0033 | 0.0016 | 0.0019 | 0.0010 | 0.0019 | 0.0040 | 0.0020 | 0.0030 | 0.0032 | 0.0015 | 0.0003 |
| 420 | 0.0011 | 0.0035 | 0.0042 | 0.0013 | 0.0022 | 0.0015 | 0.0024 | 0.0068 | 0.0022 | 0.0035 | 0.0043 | 0.0017 | 0.0005 |
| 440 | 0.0010 | 0.0047 | 0.0067 | 0.0014 | 0.0025 | 0.0018 | 0.0032 | 0.0119 | 0.0023 | 0.0038 | 0.0059 | 0.0019 | 0.0007 |

TABLE 9-continued

| Wave-length nm | Component No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 460 | 0.0009 | 0.0047 | 0.0075 | 0.0020 | 0.0030 | 0.0031 | 0.0041 | 0.0161 | 0.0027 | 0.0044 | 0.0073 | 0.0023 | 0.0013 |
| 480 | 0.0008 | 0.0035 | 0.0050 | 0.0043 | 0.0041 | 0.0049 | 0.0061 | 0.0180 | 0.0037 | 0.0054 | 0.0091 | 0.0031 | 0.0019 |
| 500 | 0.0008 | 0.0032 | 0.0025 | 0.0071 | 0.0059 | 0.0067 | 0.0091 | 0.0162 | 0.0056 | 0.0071 | 0.0107 | 0.0044 | 0.0033 |
| 520 | 0.0008 | 0.0048 | 0.0025 | 0.0111 | 0.0086 | 0.0103 | 0.0125 | 0.0154 | 0.0084 | 0.0087 | 0.0118 | 0.0064 | 0.0047 |
| 540 | 0.0008 | 0.0069 | 0.0025 | 0.0145 | 0.0110 | 0.0118 | 0.0148 | 0.0152 | 0.0107 | 0.0095 | 0.0121 | 0.0083 | 0.0063 |
| 560 | 0.0008 | 0.0106 | 0.0042 | 0.0181 | 0.0142 | 0.0138 | 0.0164 | 0.0135 | 0.0132 | 0.0098 | 0.0116 | 0.0108 | 0.0078 |
| 580 | 0.0008 | 0.0141 | 0.0042 | 0.0194 | 0.0161 | 0.0131 | 0.0157 | 0.0099 | 0.0138 | 0.0087 | 0.0099 | 0.0121 | 0.0087 |
| 600 | 0.0008 | 0.0144 | 0.0042 | 0.0180 | 0.0162 | 0.0105 | 0.0135 | 0.0068 | 0.0127 | 0.0070 | 0.0081 | 0.0120 | 0.0087 |
| 620 | 0.0007 | 0.0103 | 0.0033 | 0.0128 | 0.0142 | 0.0067 | 0.0088 | 0.0031 | 0.0087 | 0.0046 | 0.0055 | 0.0100 | 0.0076 |
| 640 | 0.0004 | 0.0048 | 0.0033 | 0.0062 | 0.0096 | 0.0028 | 0.0043 | 0.0010 | 0.0040 | 0.0026 | 0.0003 | 0.0064 | 0.0051 |
| 660 | 0.0003 | 0.0017 | 0.0025 | 0.0022 | 0.0045 | 0.0005 | 0.0016 | 0.0003 | 0.0013 | 0.0010 | 0.0015 | 0.0029 | 0.0024 |
| 680 | 0.0002 | 0.0006 | 0.0011 | 0.0021 | 0.0003 | 0.0003 | 0.0007 | 0.0001 | 0.0005 | 0.0002 | 0.0008 | 0.0013 | 0.0010 |
| 700 | 0.0001 | 0.0002 | 0.0003 | 0.0007 | 0.0003 | 0.0003 | 0.0002 | 0.0001 | 0.0002 | 0.0001 | 0.0003 | 0.0004 | 0.0003 |

Figure 8:
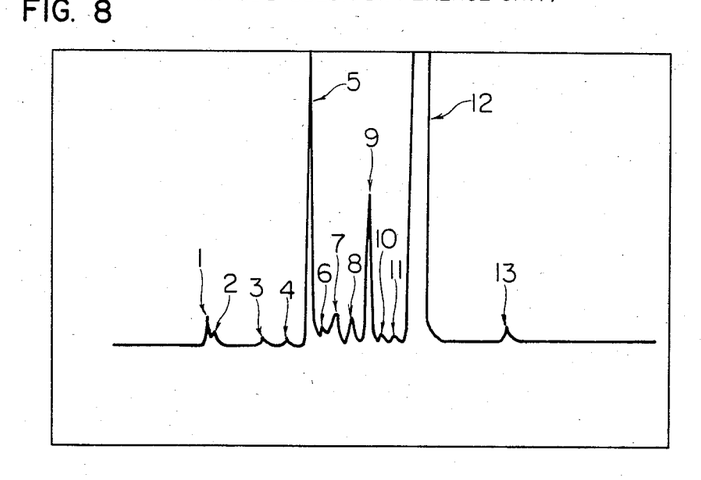
FIG. 8 is a liquid chromatogram of the dye in Example 2.

Into 300 parts of water, is added 0.2 part of the dye together with 10 parts of spun polyester yarn. The mixture is heated at 130° C. under applied pressure for 60 minutes to effect dyeing. After dyeing, the yarn is washed with hot water, then subjected to reduction clearing and subsequent drying. In a customary manner, 1 part of the dyed yarn is extracted with 50 parts of chlorobenzene. Individual components contained in the extract are separated and quantitatively determined by liquid chromatography under the aforementioned conditions of separation to select the components fixed onto the yarn. In the liquid chromatogram shown in FIG. 8, the components No. 1, 2, 3 and 7 are unfixed components, so their dyeing coefficients $S_1$, $S_2$, $S_3$ and $S_7$, respectively, are assumed to be 0, whereas those of other components to be 1.0.

Separation and quantitative determination of individual components of the standard dye and two or more representative samples are carried out under the same conditions of separation as described above. Using the ratio, $P_n$ (Table 10), of separated individual component to main component thus determined with respect to the standard dye and representative sample dye, the mixing calculation is carried out according to the aforementioned formula [1] to determine the absorbance of mixture (Table 11).

TABLE 10

| Standard dye | | Representative sample | |
|---|---|---|---|
| Component No. | Ratio to main component, % | Component No. | Ratio to main component, % |
| 1 | 0.14 | 1 | 0.14 |
| 2 | 0 | 2 | 0 |
| 3 | 0 | 3 | 0 |
| 4 | 0.04 | 4 | 0.04 |
| 5 | 2.29 | 5 | 2.10 |
| 6 | 0.07 | 6 | 0.08 |
| 7 | 0.13 | 7 | 0.12 |
| 8 | 0.09 | 8 | 0.12 |
| 9 | 1.83 | 9 | 1.90 |
| 10 | 0.14 | 10 | 0.18 |
| 11 | 0.04 | 11 | 0.04 |
| 12 | 100.00 | 12 | 100.00 |
| 13 | 0.11 | 13 | 0.05 |

TABLE 11

| | Sample | | |
|---|---|---|---|
| Wave-length, nm | Absorbance of mixture of standard dye | Absorbance of mixture of representative sample | Adjusted absorbance of mixture of representative sample |
| 400 | 0.1557 | 0.1557 | 0.1559 |
| 420 | 0.1773 | 0.1774 | 0.1776 |
| 440 | 0.2050 | 0.2052 | 0.2054 |
| 460 | 0.2407 | 0.2409 | 0.2412 |
| 480 | 0.3254 | 0.3256 | 0.3259 |
| 500 | 0.4695 | 0.4694 | 0.4699 |
| 520 | 0.6841 | 0.6836 | 0.6843 |
| 540 | 0.8788 | 0.8780 | 0.8789 |
| 560 | 1.1401 | 1.1388 | 1.1400 |
| 580 | 1.2809 | 1.2790 | 1.2804 |
| 600 | 1.2635 | 1.2614 | 1.2627 |
| 620 | 1.0556 | 1.0534 | 1.0545 |
| 640 | 0.6687 | 0.6670 | 0.6677 |
| 660 | 0.3017 | 0.3008 | 0.3011 |
| 680 | 0.1387 | 0.1383 | 0.1384 |
| 700 | 0.0433 | 0.0432 | 0.0432 |

From the values of absorbance, the complementary tristimulus values X', Y', Z' of the standard dye and the representative sample dye are calculated according to the formulas [3], and the total complementary tristimulus values, SQ, are calculated according to the formula [4], to obtain the following results:

X' = 86.75

Y' = 90.18

Z' = 26.37

SQ = 203.30 for the standard dye and

X' = 86.62

Y' = 90.07

Z' = 26.39

SQ = 203.08 for the representative sample dye.

From the value of SQ and the formula [5], the absorbance of the representative sample dye adjusted to the same optical density as that of the standard dye is calculated (Table 11).

The absorbance of the standard dye and the absorbance of the representative sample dye adjusted to the same optical density are then transformed into transmittances through the equation [6] (Table 12).

TABLE 12

| Wavelength, nm | Sample Standard dye | Representative sample |
|---|---|---|
| 400 | 0.699 | 0.698 |
| 420 | 0.665 | 0.664 |
| 440 | 0.624 | 0.623 |
| 460 | 0.575 | 0.574 |
| 480 | 0.473 | 0.472 |
| 500 | 0.339 | 0.339 |
| 520 | 0.207 | 0.207 |
| 540 | 0.132 | 0.132 |
| 560 | 0.072 | 0.072 |
| 580 | 0.052 | 0.052 |
| 600 | 0.055 | 0.055 |
| 620 | 0.088 | 0.088 |
| 640 | 0.214 | 0.215 |
| 660 | 0.499 | 0.500 |
| 680 | 0.727 | 0.727 |
| 700 | 0.905 | 0.905 |

The tristimulus values, X, Y, Z, of the standard dye and the representative sample dye are calculated from the transmittance values according to the formulas [7] to obtain the following results:

$X = 18.963$ $Y = 17.110$ $Z = 61.976$ for the standard dye and $X = 18.963$ $Y = 17.107$ $Z = 61.916$ for the representative sample dye.

The coordinates are transformed through the equations [9] into a uniform color scale such as, for example, CIE 1976 ($L^*a^*b^*$) colorimetric system recommended by CIE in 1976. The results obtained are $L^* = 48.420$ $a^* = 14.810$ $b^* = -55.470$ for the standard dye and $L^* = 48.417$ $a^* = 14.827$ $b^* = -55.422$ for the representative sample dye.

The foregoing operation is repeated by selecting several representative samples different from one another in proportions of coloring matter components.

Measurement of Color Difference of Dyeings on Representative Sample

Dye solutions are prepared by dissolving in 300 parts of water 0.2 part of the same standard dye or 0.16 part (a quantity which gives a solution of the same depth of color as that of the standard dye and which is variable for each representative sample) of the same representative samples as used above. To each solution is added 10 parts of spun polyester yarn. The mixture is heated at 130° C. under applied pressure for 60 minutes to effect dyeing. After dyeing, the yarn is washed with hot water and subjected to reduction clearing, washing with hot water, and drying. The color difference of dyeings of representative samples against the dyeings of the standard dye is measured in terms of hue difference and brightness difference.

Determination of Relationship Between Color Difference of Dyeings and Color Difference of Dye Solution with Respect to Representative Sample Using the data of color difference of dyeings and the color difference of solution obtained above, regression analysis is performed to determine the relationship in the form of regression line between the color difference of dye solution and the color difference of dyeings with respect to representative samples. There are obtained the following relationships:

Hue difference of dyeings = 1.35 = (hue difference of solution)

Brightness difference of dyeings = $-0.98 \times$ (brightness difference of solution) $+0.22$ Measurement of Color Difference of Solution of Sample Dye In a manner similar to that described previously, the color difference of solution of the sample dye is measured in terms of hue difference and brightness difference against the standard dye.

Prediction of Color Difference of Dyeings with Respect to Sample Dye

Using the color difference of solution of the sample dye obtained above, the predicted color difference of dyeings is obtained from the regression line. In Table 13 are shown both the predicted color difference thus obtained and the color difference obtained by actual dyeing with the sample dye.

TABLE 13

| Sample No. | | CIE 1976 L*a*b* colorimetric system | | |
|---|---|---|---|---|
| | | Color difference of solution | Predicted color difference of dyeings | Result of dyeing |
| 2-1 | Hue | 0.03 | 0.04 | 0.04 |
| | Brightness | 0.04 | 0.18 | 0.18 |

The values of predicted color difference of dyeings obtained on other sample dyes (2-2 to 2-7) are shown in Table 14 together with the results of dyeing in side-by-side arrangement.

TABLE 14

| Sample No. | | CIE 1976 L*a*b* colorimetric system | | |
|---|---|---|---|---|
| | | Color difference of solution | Predicted color difference of dyeings | Result of dyeing |
| 2-2 | Hue | 0.09 | 0.12 | 0.12 |
| | Brightness | 0.20 | 0.02 | 0.03 |
| 2-3 | Hue | 0.06 | 0.08 | 0.08 |
| | Brightness | 0.09 | 0.13 | 0.10 |
| 2-4 | Hue | 0.06 | 0.08 | 0.09 |
| | Brightness | 0.03 | 0.19 | 0.20 |
| 2-5 | Hue | 0.05 | 0.07 | 0.07 |
| | Brightness | 0.03 | 0.19 | 0.19 |
| 2-6 | Hue | 0.01 | 0.02 | 0.01 |
| | Brightness | 0.09 | 0.13 | 0.12 |
| 2-7 | Hue | 0.01 | 0.02 | 0.02 |
| | Brightness | 0.05 | 0.17 | 0.16 |

As is seen from the above experimental results, the predicted values of color difference of dyeings obtained by the above method (predicted color difference of dyeings) show satisfactory agreement with the values obtained by actual dyeing (result of dyeing).

EXAMPLE 3

Measurement of Color Difference of Representative Sample Solution

Color Index No. (C.I. No.) Disperse Blue 139, one of the disperse dyes difficulty soluble or insoluble in water, is used. A dye solution prepared by dissolving 0.005 part of the standard dye or a representative sample in 80 % acetonitrile and making up to 100 parts is measured for the distribution curve of absorbance in the visible spectrum range by means of a common spectrophotometer.

In the next steps, the above distribution curve is converted by means of the formula [2] so that the optical density of the representative sample may become identical with that of the standard dye. Alternatively, the conversion is also possible by calculating the complementary tristimulus values X, Y, Z by means of the formulas [3], then calculating the total complementary tristimulus values, SQ, by means of the formula [4], and converting the absorbance curve of the representative sample dye by using the value of SQ and the formula [5] so that the optical density of the representative sample may become identical with that of the standard dye.

The absorbance of the standard dye and the converted absorbance of the representative sample dye are transformed through formulas [6] into transmittance and the tristimulus values X, Y, Z are calculated according to the formulas [7]. The calculated values are $X = 12.870$ $Y = 7.500$ $Z = 31.964$ for the standard dye and $X = 12.993$ $Y = 7.514$ $Z = 31.579$ for the representative sample dye.

The coordinates are then transformed through the formulas [9] into a uniform color scale such as CIE 1976 ($L^*a^*b^*$) colorimetric system recommended by CIE in 1976. These values are $L^* = 32.936$ $a^* = 46.094$ $b^* = -49.182$ for the standard dye and $L^* = 32.966$ $a^* = 46.779$ $b^* = -48.591$ for the representative sample dye. The color difference of solution of the representative sample dye relative to the standard dye is derived from the above colorimetric system and the formulas [10] to obtain the following results:

Hue difference = 0.90
Brightness difference = 0.05

The foregoing operation is repeated on several representative sample different from one another in proportions of coloring matter components.

Measurement of Color Difference of Dyeings on Representative Sample

Dye solutions are prepared by dissolving in 300 parts of water 0.2 part of the standard dye or 0.16 part (a quantity which gives a solution of the same depth of color as that of the standard dye and which is variable for each representative sample) of the same representative sample as used above. To each solution is added 10 parts of spun polyester yarn. The mixture is heated at 130° C. under applied pressure for 60 minutes to effect dyeing. After dyeing, the yarn is washed with hot water and subjected to reduction clearing, washing with hot water, and drying. The color difference of dyeings of representative sample dye relative to the dyeings of the standard dye is measured in terms of hue difference and brightness difference.

Determination of Relationship Between Color Difference of Dyeings and Color Difference of Dye Solution with Respect to Representative Sample Using the data of color difference of dyeings and the color difference of solution obtained above, regression analysis is performed to determine the relationship in the form of regression line between the color difference of dye solution and the color difference of dyeings with respect to representative samples. There are obtained the following relationships:

Hue difference of dyeings = 0.13 × (hue difference of solution)

Brightness difference of dyeings = −1.8 × (brightness difference of solution) + 0.28

Measurement of Color Difference of Solution of Sample Dye

In a manner similar to that described previously, the color difference of solution of the sample dye is measured in terms of hue difference and brightness difference against the standard dye.

Prediction of Color Difference of Dyeings with Respect to Sample Dye

Using the color difference of solution of the sample dye obtained above, the predicted color difference of dyeings is obtained from the regression line. In Table are shown both the predicted color difference thus obtained and the color difference obtained by actual dyeing with the sample dye.

TABLE 15

| Sample No. | | CIE 1976 L*a*b* colorimetric system | | |
| --- | --- | --- | --- | --- |
| | | Color difference of solution | Predicted color difference of dyeings | Result of dyeing |
| 3-1 | Hue | 0.90 | 0.12 | 0.12 |
| | Brightness | 0.05 | 0.19 | 0.19 |

The values of predicted color difference of dyeings obtained on other samples (3-2 to 3-9) are shown in Table 16 together with the results of dyeing in side-by-side arrangement.

TABLE 16

| Sample No. | | CIE 1976 L*a*b* colorimetric system | | |
| --- | --- | --- | --- | --- |
| | | Color difference of solution | Predicted color difference of dyeings | Result of dyeing |
| 3-2 | Hue | 0.67 | 0.09 | 0.07 |
| | Brightness | 0.04 | 0.21 | 0.22 |
| 3-3 | Hue | 0.73 | 0.09 | 0.08 |
| | Brightness | 0.05 | 0.19 | 0.19 |
| 3-4 | Hue | 0.93 | 0.12 | 0.12 |

TABLE 16-continued

| Sample No. | | CIE 1976 L*a*b* colorimetric system | | |
|---|---|---|---|---|
| | | Color difference of solution | Predicted color difference of dyeings | Result of dyeing |
| 3-5 | Brightness | 0.08 | 0.14 | 0.14 |
| | Hue | 0.09 | 0.01 | 0.01 |
| 3-6 | Brightness | 0.02 | 0.24 | 0.25 |
| | Hue | 0.39 | 0.05 | 0.04 |
| 3-7 | Brightness | 0.01 | 0.26 | 0.26 |
| | Hue | 0.83 | 0.11 | 0.10 |
| 3-8 | Brightness | 0.01 | 0.26 | 0.26 |
| | Hue | 0.94 | 0.12 | 0.12 |
| 3-9 | Brightness | 0.06 | 0.17 | 0.16 |
| | Hue | 0.71 | 0.09 | 0.08 |
| | Brightness | 0.03 | 0.23 | 0.22 |

As is seen from the above experimental results, the predicted values of color difference of dyeings obtained by the above method (predicted color difference of dyeings) show satisfactory agreement with the values obtained by actual dyeing (result of dyeing).

What is claimed is:

1. A method for measuring the color different between a sample dye and a standard dye by testing the color properties of both dyes, which comprises:
   (a) measuring the distribution curve of absorbance of each component of the dye by separating each of the components contained in the standard dye and in representative samples of the dye by chromatography, determining the content of each separated component by quantitative analysis, measuring a distribution curve of absorbance for each component separated, and calculating a distribution curve of absorbance per unit content for each component separated;
   (b) deriving a relationship between color differences of dye solutions and color differences of dyeings made with the standard dye and the representative samples by using the previously determined distribution curves of absorbance per unit content of the separated components and the contents determined by quantitative analysis of each separated component with respect to the standard dye and the representative samples, thereby to obtain the distribution curves of absorbance of a mixture with respect to the standard dye and the representative samples, setting the said distribution curves of absorbance of the representative samples obtained to coincide with that of the standard dye using optical density ratios between the standard dye and the representative samples, transforming the said distribution curve of absorbance of the standard dye obtained and the said coincident distribution curves of absorbance of the representative samples into transmittance curves to obtain tristimulus values X, Y, Z for both the standard dye and the representative samples, transforming the tristimulus values into a uniform color scale colorimetric system and determining hue and saturation or brightness difference between the standard dye and representative samples in that colorimetric system, determining the color differences between dyeings prepared with the standard dye and the representative samples in terms of hue and saturation or brightness, and deriving the relationship between the previously determined color differences of the dye solution and the previously determined color differences of the dyeings in terms of hue and saturation or brightness;
   (c) calculating the color differences between standard dye and solutions cf the sample dye in terms of hue and saturation or brightness, as previously described; and
   (d) predicting the color differences of dyeings of the sample dye from the color differences of the solution of the sample dye previously determined using the relationship derived above.

2. A method according to claim 1, wherein high performance liquid chromatography is used as the means to separate the individual components contained in the dye.

3. A method according to claim 1, wherein a distribution curve of absorbance is corrected using a weighting factor.

* * * * *